(12) United States Patent
Chen et al.

(10) Patent No.: US 7,152,496 B2
(45) Date of Patent: Dec. 26, 2006

(54) SCREW NUT ASSEMBLY OF LINEAR ACTUATION DEVICE

(75) Inventors: Chih Hsien Chen, Sindian (TW); Chih Hsien Chang, Sindian (TW); Ching Feng Chan, Sindian (TW); Ming Hao Ho, Sindian (TW)

(73) Assignee: Jaegar Industrial Co. Ltd., Taipei (TW)

( * ) Notice: Subject to any disclaimer, the term of this patent is extended or adjusted under 35 U.S.C. 154(b) by 474 days.

(21) Appl. No.: 10/712,102

(22) Filed: Nov. 14, 2003

(65) Prior Publication Data

US 2005/0103138 A1   May 19, 2005

(51) Int. Cl.
    *F16C 25/20* (2006.01)
(52) U.S. Cl. .................. 74/89.26; 74/89.39; 254/100
(58) Field of Classification Search ............... 74/89.26, 74/89.39; 254/98, 100
    See application file for complete search history.

(56) References Cited

U.S. PATENT DOCUMENTS

| 1,408,891 | A | * | 3/1922  | Klausmeyer | 74/89.26 |
| 2,218,319 | A | * | 10/1940 | Pfauser    | 254/98   |
| 3,304,794 | A | * | 2/1967  | Bird       | 74/409   |
| 3,309,060 | A | * | 3/1967  | Villars    | 254/7 C  |
| 5,620,166 | A | * | 4/1997  | Lord et al.| 251/267  |
| 5,755,310 | A | * | 5/1998  | Wourms     | 187/267  |
| 5,918,505 | A | * | 7/1999  | Jensen     | 74/89.26 |

* cited by examiner

*Primary Examiner*—William C. Joyce

(57) ABSTRACT

A screw nut assembly of a linear actuation device, having a screw, a main screw nut and a safety screw nut is disclosed. The main screw nut and the safety screw nut engaged with the screw are operative to displace linearly along an axis of the screw. The safety screw nut includes an exterior surface and the main screw nut includes a receiving portion for receiving the safety screw nut therein. The receiving portion includes an interior surface recessed with at least one slot and a spring disposed within the slot, such that the safety screw nut is inserted into the receiving portion by a resilient force exerted by the spring.

2 Claims, 5 Drawing Sheets

SCREW NUT ASSEMBLY OF LINEAR ACTUATION DEVICE

BACKGROUND OF THE INVENTION

The present invention relates to a screw nut assembly of a linear actuation device, and more particular, to a screw nut assembly of which the main screw nut can be ejected by spring force when the threads thereof are worn out.

Linear actuation device uses motors, gears and lever linkage for driving a guide screw, so as to provide linear extension and retraction movements of an interior tube. Such device has been commonly applied to elevate or lower a sickbed or other devices.

The screw of the typical linear actuation device uses a screw nut threaded with the screw to perform movements of the interior tube. To reduce the noise caused by friction between the screw nut and the screw, plastic material has been used to fabricate the screw nut. However, as the screw is typically fabricated from metal, the threads formed on the screw nut are easily abraded. Therefore, the screw nut becomes inoperative to carry the load, such that the linear actuation device cannot operate normally. Further, the interior will suddenly sink without the support of the screw nut.

BRIEF SUMMARY OF THE INVENTION

The present invention provides a screw nut assembly of a linear actuation device. The screw nut assembly includes a main screw nut and a safety screw engaged with each other by spring force. When the threads of the main screw are worn out, the main screw nut is ejected by spring force, and the safety screw nut replaces the main screw nut to carry the load applied on the main screw. Therefore, the damage of the linear actuation device is prevented.

The screw nut assembly of a linear actuation device provided by the present invention comprises a screw, a main screw nut and a safety screw nut.

The main screw nut and the safety screw nut engaged with the screw are operative to displace linearly along an axis of the screw. The safety screw nut includes an exterior surface and the main screw nut includes a receiving portion for receiving the safety screw nut therein. The receiving portion includes an interior surface recessed with at least one slot and a spring disposed within the slot, such that the safety screw nut is inserted into the receiving portion by a resilient force exerted by the spring.

BRIEF DESCRIPTION OF THE DRAWINGS

These, as well as other features of the present invention, will become apparent upon reference to the drawings wherein.

DETAILED DESCRIPTION OF THE INVENTION

Figure 1:
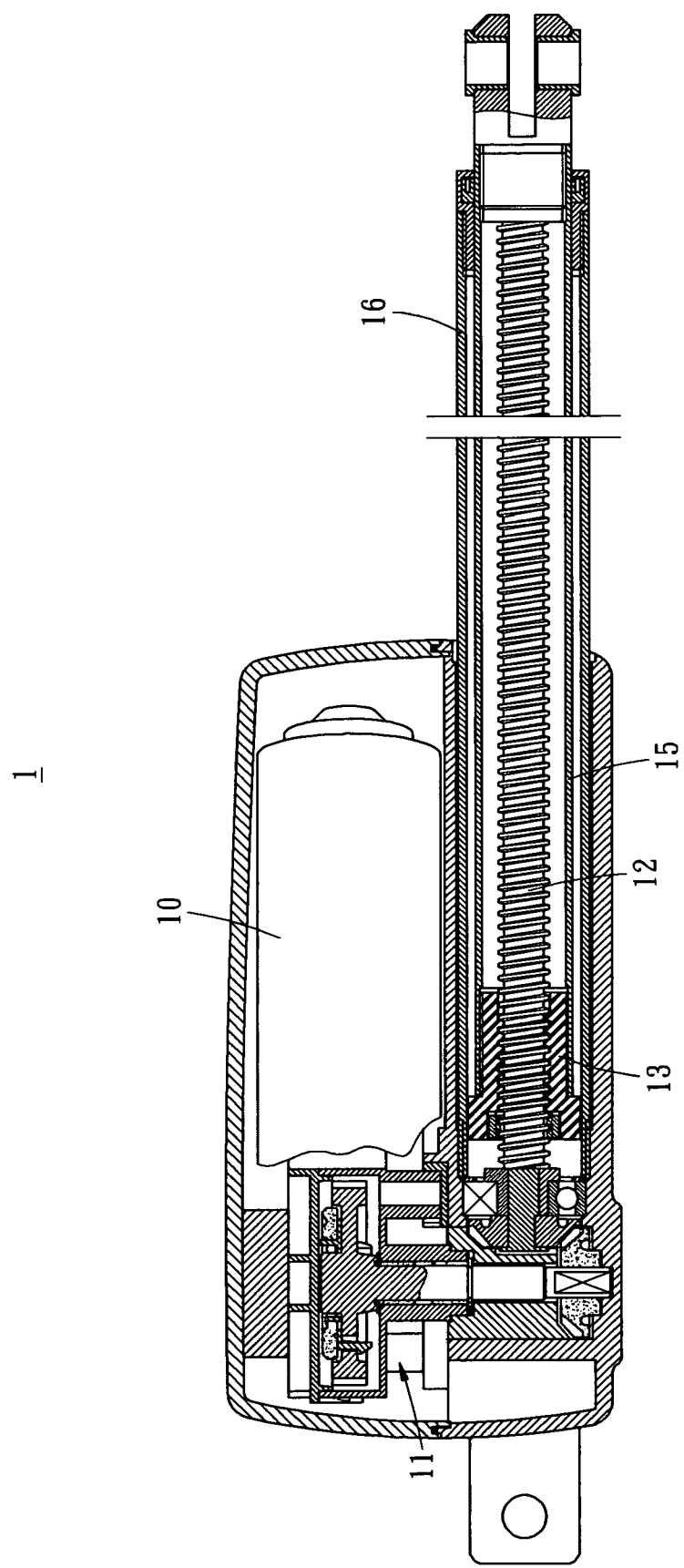
FIG. 1 shows a cross sectional view of a screw nut assembly applied to a linear actuation device.
Figure 2:
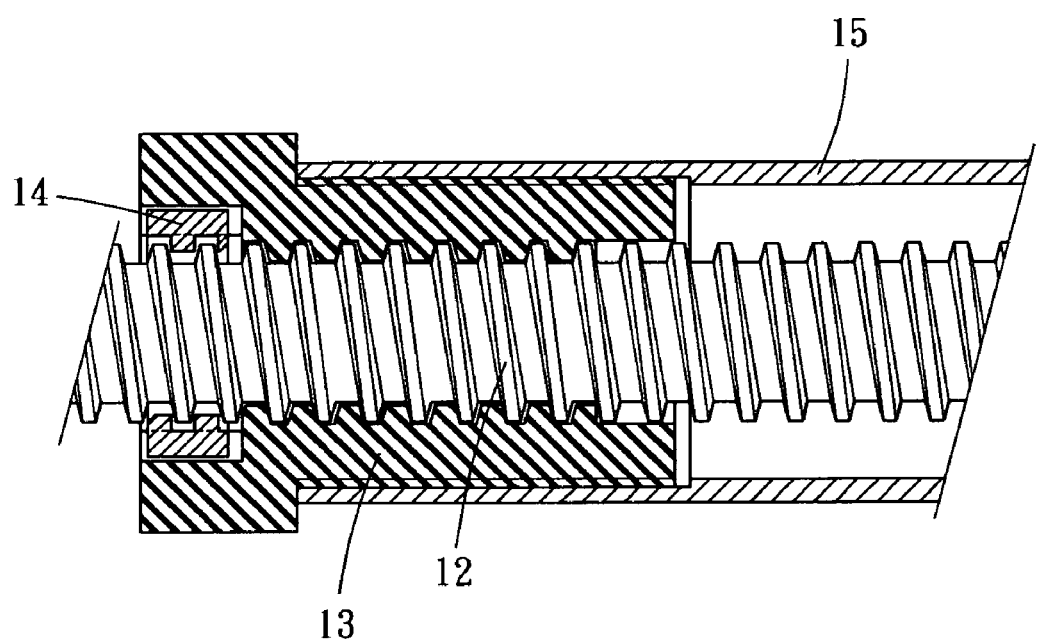
FIG. 2 shows enlarged views of the main screw nut and the safety screw nut of the screw nut assembly.

As shown in FIG. 1, a linear actuation device 1 includes a motor 10 to actuate a driving assembly 11 which includes gears and linking levers, which then drives a screw 12 to rotate. Under normal operation conditions, the threads of the screw 12 are engaged with a main screw nut 13 and a safety screw nut 14 (as shown in FIG. 2), which synchronously drive the screw 12 to perform axial linear displacement, so as to drive the interior tube 15 connected to the main screw nut 13. The movement of the interior tube 15 then actuates the extension or retraction of the exterior tube 16 of the actuation device 1.

Figure 3:
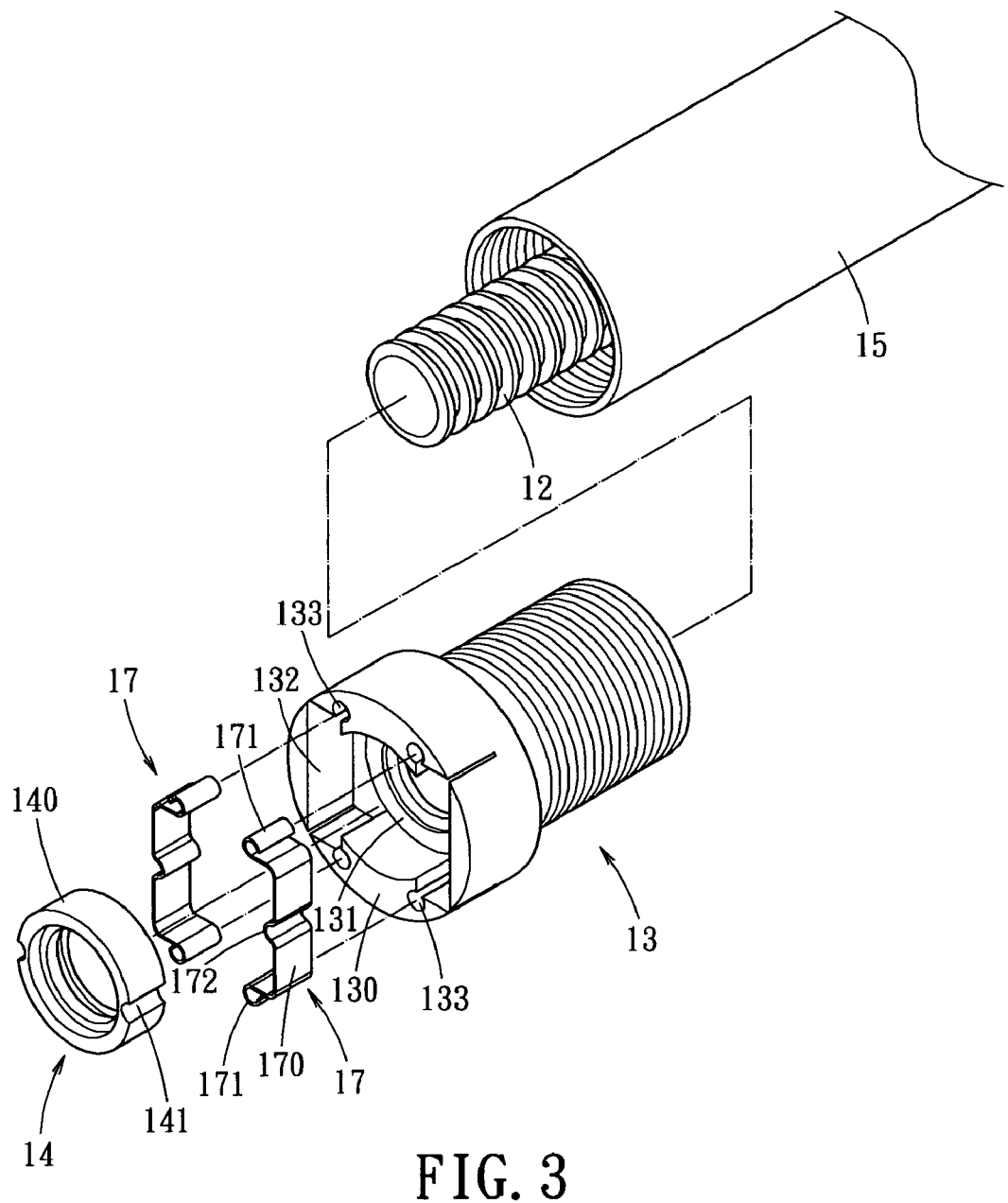
FIG. 3 shows an exploded view of the screw nut assembly.
Figure 4:
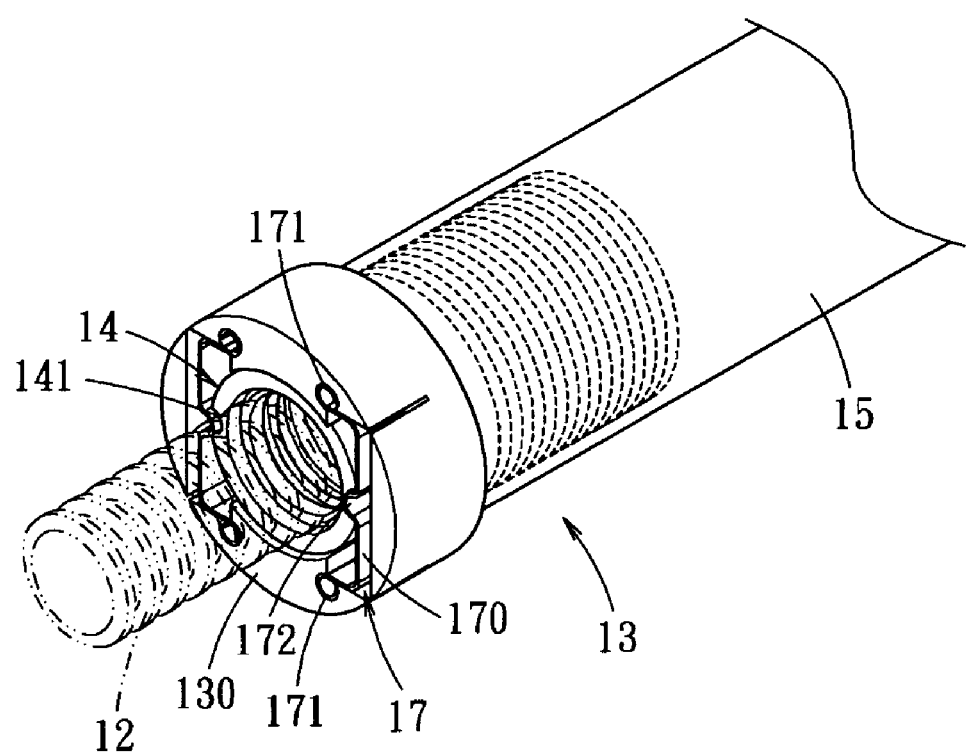
FIG. 4 shows a perspective view of the screw nut assembly.
Figure 5:
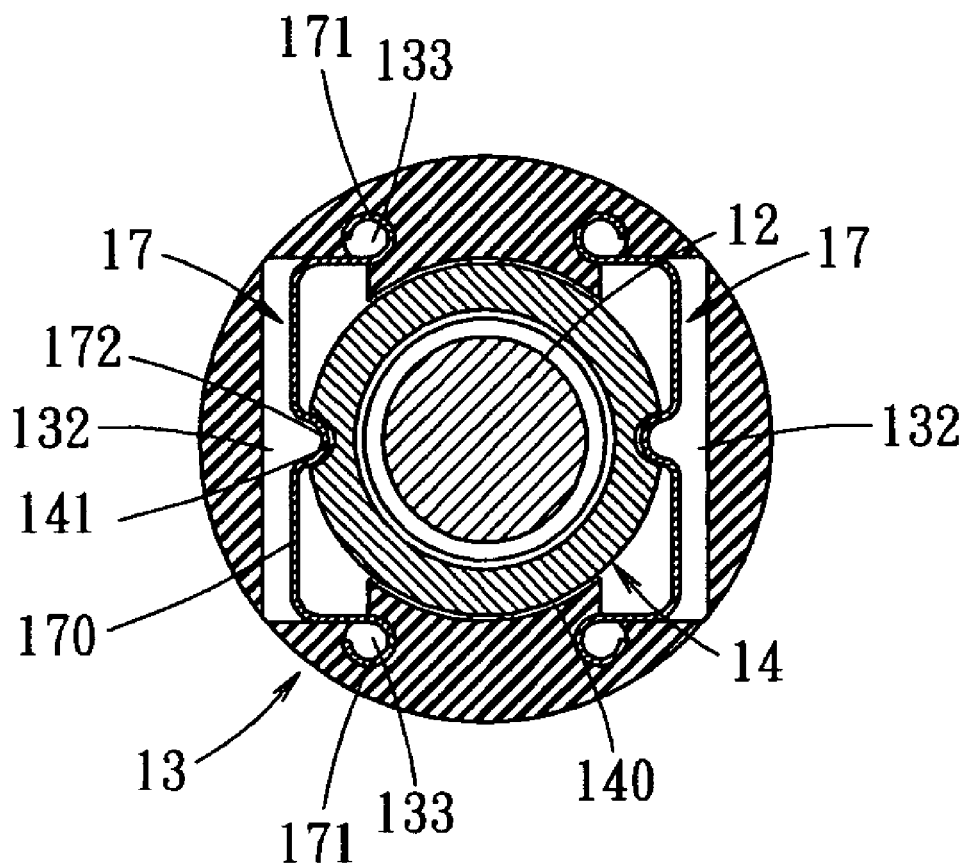
FIG. 5 shows a cross sectional view of the screw nut assembly.

As shown in FIGS. 3–5, an exploded view, a perspective view and a cross-sectional view of a first embodiment of a screw nut assembly for the actuation device are illustrated. The screw nut assembly includes a main screw nut 13 and a safety screw nut 14 to be engaged with the screw 12. The main screw nut 13 is preferably fabricated from plastic material to reduce noise caused by friction between the screw 12 and the main screw nut 13 when a relative linear displacement is performed. The safety screw nut 14 is preferably fabricated from metal. As a consequence, when the threads of the main screw nut 13 are worn out, the safety screw nut 14 will replace the main screw nut 13 to carry the load of the screw 12.

The main screw nut 13 includes one threaded distal end, and one proximal end serving as a receiving part 131 for receiving the safety screw nut 14 therein. The receiving part 131 has a flange 130 and the interior sidewall of the receiving part 131 is recessed with two opposing elongate slots 132 for receiving a pair of springs 17 therein. The opposing ends of each slot 132 include a pair of circular slots 133. Each of the spring 17 includes a flat elongate portion 170, two positioning portions 171 at two opposing ends of the flat elongate portion 170 and a resilient portion 172 protruding inwardly from the middle of the flat elongate portion 170. The positioning portions 171 are inserted into the circular slots 133, while the flat elongate portions 170 lie on the sidewall of the elongate slots 132. The resilient portions 171 are aligned with each other and curved into a semi-circular shape. The safety screw nut 14 includes two opposing grooves 141 recessed from the exterior surface 140. Preferably, the grooves 141 are in circular shape to receive the resilient portions 171. Therefore, by frictionally fitting the exterior surface 140 between the springs 17, the safety screw nut 14 is engaged within the main screw nut 13 and secured by the resilient force exerted by the springs 17.

Thereby, a screw nut assembly for an actuation device is obtained.

As shown in FIG. 5, when the threads of the main screw nut 13 are worn out, as the screw 12 is still engaged with the safety screw nut 14, the screw 12 can still be supported by the safety screw nut 14 and returns to the original positions by the momentum. However, when the threads of the main screw nut 13 are worn out because of friction or abrasion, the main screw nut 13 is ejected from the screw nut assembly by spring force exerted by the resilient portions 171 of the spring 17. Meanwhile, as the safety screw nut 14 provides much fewer threads to engage with the screw 12, the available torque provided by the safety screw nut 14 is insufficient to actuate full retraction or extension movement of the screw 12. Therefore, a free spin occurs, and the user can easily observe damage of the main screw nut 13.

This disclosure provides exemplary embodiments of the present invention. The scope of this disclosure is not limited by these exemplary embodiments. Numerous variations, whether explicitly provided for by the specification or implied by the specification, such as variations in shape, structure, dimension, type of material or manufacturing process may be implemented by one of skill in the art in view of this disclosure.

What is claimed is:

1. A screw nut assembly for an actuation device which comprises a screw, comprising a main screw nut and a safety screw nut engaged with the screw, for synchronously driving the screw to perform axial linear displacement, wherein the safety screw nut includes an exterior surface and the main screw nut includes a receiving portion for receiving the safety screw nut therein, the receiving portion includes an interior recessed surface with at least one slot and a spring disposed within the slot, such that the safety screw nut is received into the receiving portion by a resilient force exerted by the spring, wherein the spring includes two terminals and the slot is recessed with two grooves to receive the terminals therein.

2. The assembly of claim 1, wherein the main screw nut is fabricated from plastic material and the safety screw nut is fabricated from metal.

* * * * *

UNITED STATES PATENT AND TRADEMARK OFFICE
CERTIFICATE OF CORRECTION

PATENT NO. : 7,152,496 B2  Page 1 of 1
APPLICATION NO. : 10/712102
DATED : December 26, 2006
INVENTOR(S) : Chih-Hsien Chen et al.

It is certified that error appears in the above-identified patent and that said Letters Patent is hereby corrected as shown below:

On the title page, item [73]:

Assignee: Jaegar Industrial Co. Ltd., Taipei (TW)

should be

Assignee: Jaeger Industrial Co. Ltd., Taipei (TW)

"Jaegar" was wrong and --Jaeger-- is correct.

Signed and Sealed this

Twenty-third Day of December, 2008

JON W. DUDAS
*Director of the United States Patent and Trademark Office*